United States Patent [19]
Maurer et al.

[11] 3,948,146
[45] Apr. 6, 1976

[54] CONTROL SYSTEM FOR HYDRAULIC COUPLING

[75] Inventors: Gerhard Maurer; Fritz Geiger, both of Friedrichshafen, Germany

[73] Assignee: Zahnradfabrik Friedrichshafen AG, Friedrichshafen, Germany

[22] Filed: June 19, 1973

[21] Appl. No.: 371,561

[30] Foreign Application Priority Data
June 22, 1972 Germany............................ 2230425

[52] U.S. Cl.................. 91/411 A; 60/468; 91/421; 91/451; 91/464; 192/87.19; 192/109 F
[51] Int. Cl.² F15B 11/16; F15B 13/06; F16D 25/06
[58] Field of Search ............ 91/421, 451, 468, 464, 91/6, 442, 411 A; 192/109 F, 87.18, 87.19; 60/450, 451, 459, 462, 468

[56] References Cited
UNITED STATES PATENTS

| | | | |
|---|---|---|---|
| 1,964,196 | 6/1934 | Cuttat.................... | 91/421 |
| 2,501,483 | 3/1950 | Taylor.................... | 91/421 |
| 2,683,966 | 7/1954 | Tyler..................... | 91/421 X |
| 2,981,287 | 4/1961 | Caslow................... | 91/464 X |
| 3,351,170 | 11/1967 | Hengstler................ | 192/109 F |
| 3,398,650 | 8/1968 | Garnjost................. | 91/421 |
| 3,429,123 | 2/1969 | Burroughs............... | 60/450 |
| 3,527,328 | 9/1970 | Maurice.................. | 192/87.19 X |
| 3,584,538 | 6/1971 | Petersen................. | 91/421 |

*Primary Examiner*—Irwin C. Cohen
*Attorney, Agent, or Firm*—Karl F. Ross; Herbert Dubno

[57] ABSTRACT

A dual hydraulic clutch with two operating positions and an intermediate neutral position receives pressure fluid through a three-position selector valve communicating with a pair of piston cylinders which are alternately under high and low fluid pressure in operation and are both under low pressure in neutral. Shifting the control valve partly unloads one of the cylinders into a throttled discharge line with generation of a pressure drop therein to actuate a bypass valve for instantly lowering the pressure in a supply line; the disappearance of this pressure drop upon termination of shifting gradually recloses the bypass valve for progressively raising the supply pressure to its operating level.

4 Claims, 1 Drawing Figure

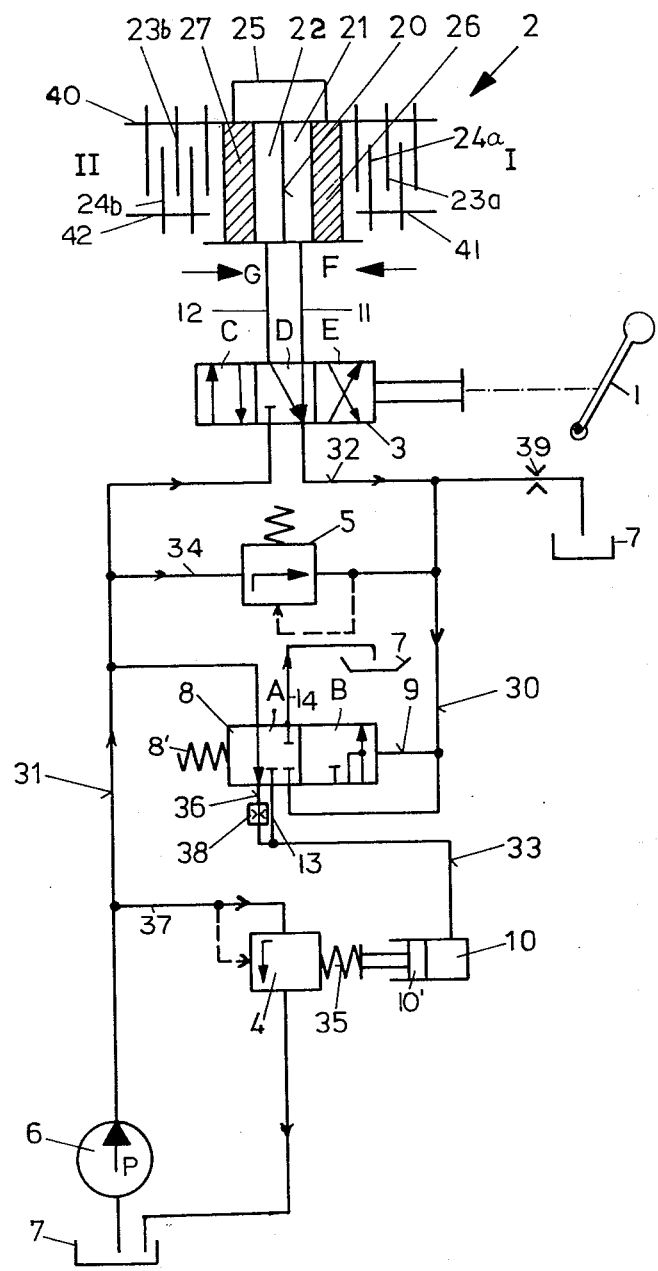

CONTROL SYSTEM FOR HYDRAULIC COUPLING

FIELD OF THE INVENTION

Our present invention relates to a control system for a hydraulic coupling such as a dual clutch having two jointly displaceable pistons in alternately pressurizable piston cylinders.

BACKGROUND OF THE INVENTION

In our copending application Ser. No. 347,341 filed Apr. 2, 1973, now U.S. Pat. No. 3,834,503, we have disclosed a dual hydraulic coupling to be used, for example, in an automotive transmission in which an engine-driven input shaft is to be coupled to an output shaft through either of two pinions forming part of a reversing gear. The coupling includes two jointly displaceable pistons moving in respective cylinders which are alternately connectable, through a selector valve, with the high-pressure side and the low-pressure side of a fluid source in order to establish either one or the other operating position.

In the hydraulic actuation of automotive clutches and brakes, which have become collectively known in the art as drive-establishing means, it is desirable to admit pressure fluid (referred to hereinafter as oil) to the working cylinder thereof at a controlled rate designed to soften the shock of the cut-in and to reduce the wear of the frictionally interengaging blades of the clutch or brake assembly. The gradual increase of the supply pressure, reaching its normal operating level a certain time after the shifting of the selector valve, is controlled by a timer, e.g. as disclosed in commonly owned application Ser. No. 177,320 filed Sept. 2, 1971 by Klaus Podssuweit and Winfried Felder, now U.S. Pat. No. 3,814,224. However, both the initial pressure and the rate of pressure buildup may vary as a result of fluctuations of such parameters as supply pressure and operating temperature.

OBJECT OF THE INVENTION

The general object of our present invention, therefore, is to provide an improved control system for a hydraulic coupling of the aforedescribed type, i.e. with two cylinders for driving a pair of interconnected pistons in one or the other direction, which minimizes the dependence on such variable parameters.

A more specific object is to provide a system of this type for the control of a three-position coupling such as, for example, a reversing clutch with two working positions and a neutral position.

SUMMARY OF THE INVENTION

Our invention is based upon the fact that, in a two-cylinder coupling of the character set forth, a previously filled cylinder empties upon the pressurization of the other cylinder so that the outflow of oil through a throttled discharge line generates a pressure drop which terminates when the other cylinder is fully loaded, i.e. when the two interconnected pistons come to a halt. Thus, in accordance with our invention, the pressure in a supply line is relatively quickly reduced by pressure-control means responsive to the pressure drop in the associated discharge line, the disappearance of this pressure drop starting a delayed buildup of a fluid flow which causes a relatively slow restoration of the supply pressure to its normal value.

Advantageously, according to a more particular feature of our invention, the pressure-control means includes a bypass valve inserted between the supply line and the low-pressure side of the fluid source, this bypass valve having a hydraulic actuator which is rapidly withdrawn in the presence of the aforementioned pressure drop through the intermediary of a sensing valve establishing an unrestricted discharging path for the actuator. Such withdrawal opens the bypass valve, i.e. lowers its flow resistance, to an extent reducing the supply pressure to a predetermined minimum. The bypass valve is also acted upon by that supply pressure and by a countervailing spring pressure. When the outflow through the discharge line ceases so that its abnormal pressure rise vanishes, the hydraulic actuator is slowly advanced, with progressive closure of the bypass valve. Such closure, caused by the admission of oil to the actuator over a restricted charging path established by the sensing valve, is resisted by the supply pressure which therefore has two components tending to shift the bypass valve in opposite senses. This arrangement regulates the normal supply pressure and consequently makes the off-normal minimum pressure and the buildup period substantially independent of fluctuations in the source output.

If the hydraulic coupling has a neutral position, the selector valve may establish this position by simultaneously connecting both cylinders to the discharge line. Upon prolonged residence in that neutral position, however, the cylinders could be substantially emptied of oil so that a subsequent pressurization of one cylinder might not generate the desired pressure rise, owing to insufficient outflow from the other cylinder. According to a further feature of our invention, therefore, we prefer to interconnect the supply and discharge lines by a pressure-reducing branch line maintaining a certain pressure head in the discharge line, upstream of its throttle, of a magnitude not so high as to trip the sensing valve.

BRIEF DESCRIPTION OF THE DRAWING

The above and other features of our invention will be described in detail hereinafter with reference to the accompanying drawing, the sole FIGURE of which is a hydraulic diagram illustrating our improved control system.

SPECIFIC DESCRIPTION

As shown in the drawing, a hydraulic coupling 2 (whose construction may be similar to that disclosed in our copending application Ser. No. 347,341 and U.S. Pat. No. 3,834,503) comprises two symmetrical clutch halves I and II with interleaved annular blades 23a, 24a and 23b, 24b, respectively; the blades 23a, 23b are axially slidable on a central body 40 rigid with an input shaft whereas the blades 24a and 24b are mounted on a pair of pinions 41, 42 forming part of respective power trains. Body 40 forms a pair of annular cylinders 21, 22 which are separated by a fixed annular partition 20 and contain two annular pistons 26, 27 interconnected by a rigid link 25. Of these annular elements, only a small peripheral portion remote from their common axis has been schematically illustrated.

Cylinders 21 and 22 communicate with respective conduits 11, 12 adapted to be alternately connected, via a three-position selector valve 3, with a supply line 31 and a discharge line 32. Supply line 31 originates at the high-pressure side of an oil pump 6 whereas discharge line 32 empties into a sump 7 for return to the low-pressure side of the pump. Selector valve 3 is manually or electromagnetically displaceable, under the control of a shift lever 1, for operative alignment of any one of its three sections C, D and E with conduits 11, 12 and lines 31, 32. In position C it admits oil under pressure via conduit 12 to cylinder 22 so that pistons 26 and 27 shift to the left (arrow F), actuating the clutch half II and expelling oil from cylinder 21 into discharge line 32 which is throttled by a constriction 39 just ahead of sump 7. In position D both conduits 11 and 12 are connected with discharge line 32 while supply line 31 is cut off; with low and equal fluid pressure now prevailing on opposite sides of partition 20, pistons 26, 27 assume a neutral position with both clutch halves I and II deactivated. In valve position E the oil from supply line 31 reaches the cylinder 21 while the cylinder 22 discharges into line 32; the pistons shift to the right (arrow G) to actuate the clutch half I.

Oil from pump 6 also passes through a branch 34 of supply line 31 containing a spring-loaded reducing valve 5 so as to maintain a minimum pressure head in an extension 30 of line 32 ahead of throttle 39. In the illustrated neutral position D, this pressure head prevents the drainage of cylinders 21 and 22 which therefore remain filled with oil at low pressure. Thus, a shift of selector valve 3 into either of its alternate operating positions C and E to pressurize one of these cylinders again causes the escape of oil from the other cylinder into the discharge line 32 with creation of an additional pressure drop across throttle 39 and consequent increase in the pressure level of line extension 30. Line 30 is connected to a control input 9 of a two-position sensing valve 8 having sections A and B; a spring 8' bearing upon this valve maintains it in position A as long as the pressure in line 30 is normal but allows its displacement into position B in response to an abnormal pressure rise in lines 32 and 30. In its normal position A the valve 8 lets oil from supply line 31 pass over a restricted path, including a port 36 and a throttle 38, as well as a line 33 to a hydraulic actuator or jack 10 whose piston 10' acts through a compression spring 35 upon a bypass valve 4 in a line 37 extending from the ouput side to the input side of pump 6. The supply pressure in line 31 also reaches a control input of bypass valve 4 whose position is therefore normally determined by the force of spring 35 as well as by two oppositely effective components of the supply pressure acting through lines 33 and 37. With pressure-sensing valve 8 in position A, bypass valve 4 has a high flow resistance (up to infinity) so as to maintain the pressure in supply line 31 at a high level; if the delivery rate of pump 6 should change, valve 4 follows suit so as to hold that supply-pressure level substantially constant.

Upon a shift of sensing valve 8 into its alternate position B, as a result of a displacement of lever 1 and valve 3 to operate or reverse the dual clutch 2, jack 10 communicates via line 33 and two ports 13, 14, forming part of an unrestricted flow path, with sump 7 so that its piston 10' is quickly withdrawn to let the supply pressure in line 37 open the valve 4 to an extent reducing that pressure to a predetermined, finite minimum. The valve 4, however has a certain residual flow resistance even in its open position so that this reduced supply pressure is still sufficient to continue the shift of pistons 26, 27 into the selected working position with consequent continuation of fluid discharge through line 32 until the pistons have reached their limiting position, i.e. until the blades of clutch half I or II are in engagement. At that instant the outflow stops and the pressure in lines 30 and 32 drops below the threshold of sensing valve 8 which therefore returns to its normal position A. The supply pressure now again reaches the jack 10, shifting its piston 10' to the left so that valve 4 gradually recloses and progressively increases the pressure in line 31 until, after a predetermined period, the normal operating level is re-established.

We claim:
1. A hydraulic control system comprising:
a hydraulic coupling including a pair of piston cylinders provided with interconnected pistons reversibly displaceable by a pressure differential between said cylinders;
a source of pressure fluid having a high-pressure side and a low-pressure side;
a pair of conduits respectively leading to said cylinders;
a supply line and a discharge line respectively connected to said high-pressure side and to said low-pressure side;
a selector valve interprosed between said pair of conduits and said supply and discharge lines for establishing either of two operating positions of said hydraulic coupling by connecting said supply line to a respective one of said conduits and said discharge line to the other of said conduits;
throttle means in said discharge line for building up a temporary pressure rise in response to fluid flow into said discharge line from said other of said conduits upon connection of said one of said conduits to said supply line by said selector valve;
a bypass valve of variable flow resistance between said supply line and said low-pressure side provided with a control input connected to said supply line for subjecting said bypass valve to a supply-pressure component tending to lower said flow resistance by opening said bypass valve to drain said supply line to the low-pressure side;
biased valve means connected with said high-pressure side and said low-pressure side and controlled by a sensing input connected to said discharge line at a point upstream of said throttle means for displacement from a normal position established by its biasing means to an off-normal position against the force of said biasing means in response to a temporary rise in fluid pressure in said discharge line during a displacement of said pistons;
a further line provided with a restricted and an unrestricted branch terminating at said biased valve means, the latter connecting said restricted branch to said high-pressure side in said normal position and connecting said unrestricted branch to said low-pressure side in said off-normal position thereof; and
a hydraulic actuator connected to said further line and operatively linked with said bypass valve for exerting thereon a countervailing force opposing said supply-pressure component in the normal position of said biased valve means to close same for preventing draining of the supply line, said unrestricted branch when connected to said low-pressure side forming a discharging path for relatively quickly withdrawing said actuator to lower said flow resistance upon said temporary rise in fluid pressure, said restricted branch when connected to said supply line forming a charging path for rela- tively slowly advancing said actuator to increase said flow resistance upon the disappearance of said rise.

2. A control system as defined in claim 1, further comprising spring means between said bypass valve and said hydraulic actuator for maintaining said flow resistance at a predetermined magnitude in the withdrawn position of the actuator.

3. A control system as defined in claim 1 wherein said selector valve is operable to establish a neutral position for said hydraulic coupling by simultaneously connecting both said conduits to said discharge line.

4. A control system as defined in claim 3 wherein said supply line is provided with a branch including pressure-reducing means and terminating at said discharge line upstream of said throttle means for preventing a complete draining of said cylinders in said neutral position by maintaining a minimum pressure in said conduits.

* * * * *